(12) United States Patent
Lu et al.

(10) Patent No.: US 11,229,879 B2
(45) Date of Patent: Jan. 25, 2022

(54) ALKALI-BASED REMOVAL OF CHEMICAL MOIETIES FROM GAS STREAMS WITH CHEMICAL CO-GENERATION

(71) Applicant: 8 Rivers Capital, LLC, Durham, NC (US)

(72) Inventors: Xijia Lu, Durham, NC (US); Brock Alan Forrest, Durham, NC (US); Miles R. Palmer, Durham, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 0 days.

(21) Appl. No.: 16/919,696

(22) Filed: Jul. 2, 2020

(65) Prior Publication Data

US 2021/0001270 A1  Jan. 7, 2021

Related U.S. Application Data

(60) Provisional application No. 62/870,187, filed on Jul. 3, 2019.

(51) Int. Cl.
*F25J 3/02* (2006.01)
*B01D 53/75* (2006.01)
*B01D 53/78* (2006.01)
*B01D 53/96* (2006.01)

(52) U.S. Cl.
CPC ............ *B01D 53/75* (2013.01); *B01D 53/78* (2013.01); *B01D 53/965* (2013.01); *F25J 3/0266* (2013.01); *B01D 2251/604* (2013.01); *B01D 2257/504* (2013.01); *F25J 2205/40* (2013.01); *F25J 2205/82* (2013.01); *F25J 2210/80* (2013.01)

(58) Field of Classification Search
CPC .... B01D 53/62; B01D 53/78; B01D 2221/16; B01D 2257/504; B01D 2258/0283; B01D 2258/06; B01J 10/00; B01J 19/24; B01J 2219/0807; B01J 2219/24; Y02B 90/00; Y02B 90/10; Y02C 20/40; Y02E 20/32; A61L 9/145

See application file for complete search history.

(56) References Cited

U.S. PATENT DOCUMENTS 3,576,677 A  *  4/1971  Keating, Jr. et al. ........................ H01M 8/04097
                                                                                            429/431
4,069,117 A      1/1978  Cooper
2010/0137457 A1  6/2010  Kaplan
2017/0327421 A1  11/2017 Heidel et al.

FOREIGN PATENT DOCUMENTS

| JP | 2004-174369 | 6/2004 |
|----|-------------|--------|
| WO | WO 2009/039445 | 3/2009 |
| WO | WO 2011/088515 | 7/2011 |
| WO | WO 2015/109190 | 7/2015 |

OTHER PUBLICATIONS

Keith et al., "A Process for Capturing CO2 From the Atmosphere," *Joule* 2, 2018, pp. 1573-1594.

* cited by examiner

*Primary Examiner* — Timothy C Vanoy
(74) *Attorney, Agent, or Firm* — Womble Bond Dickinson (US) LLP

(57) ABSTRACT

The present disclosure provides systems and methods useful in capture of one more moieties (e.g., carbon dioxide) from a gas stream (i.e., direct air capture). In various embodiments, the systems and methods can utilize at least a scrubbing unit, a regeneration unit, and an electrolysis unit whereby an alkali solution can be used to strip the moiety (e.g., carbon dioxide) from the gas stream, the removed moiety can be regenerated and optionally purified for capture or other use, and a formed salt can be subjected to electrolysis to recycle the alkali solution back to the scrubber for re-use with simultaneous production of one or more further chemicals.

24 Claims, 2 Drawing Sheets

ALKALI-BASED REMOVAL OF CHEMICAL MOIETIES FROM GAS STREAMS WITH CHEMICAL CO-GENERATION

CROSS-REFERENCE TO RELATED APPLICATIONS

The present application claims priority to U.S. Provisional Patent Application No. 62/870,187, filed Jul. 3, 2019, the disclosure of which is incorporated herein by reference in its entirety.

FIELD OF THE DISCLOSURE

The present disclosure relates to systems and methods for removal of carbon dioxide (or other moieties) from a stream, such as air, utilizing an alkali-containing material.

BACKGROUND

It can be desirable to remove various moieties from one or more stream for purposes of purification of the one or more streams and/or for isolation of the one or more moieties. For example, there is an ever-increasing desire for means for removal of carbon dioxide from one or more streams to prevent addition of carbon dioxide to the atmosphere (e.g., removal of carbon dioxide from a flue gas stream) and/or to actually reduce the amount of carbon dioxide present in the atmosphere (e.g., direct air capture). The art to date has failed to provide suitable systems and methods to meet these needs that are economically feasible. Accordingly, there remains a need for further systems and methods for removal of one or more moieties, such as carbon dioxide, from one or more given streams.

SUMMARY OF THE DISCLOSURE

The present disclosure relates to systems and methods for direct capture of at least one moiety (e.g., carbon dioxide) from one or more streams (e.g., from air and/or another gaseous stream). The systems and methods beneficially can also simultaneously provide for co-generation of one or more value added chemicals, including but not limited to hydrogen ($H_2$), chlorine ($Cl_2$), hydrogen chloride (HCl), sodium chloride (NaCl), potassium chloride (KCl), sodium hydroxide (NaOH), potassium hydroxide (KOH), sodium carbonate ($Na_2CO_3$), potassium carbonate ($K_2CO_3$), sodium hypochlorite (NaClO), potassium hypochlorite (KClO), sodium chlorate ($NaClO_3$), potassium chlorate ($KClO_3$), dichlorine monoxide ($Cl_2O$), chlorine dioxide ($ClO_2$), sodium perchlorate ($NaClO_4$), potassium perchlorate ($KClO_4$) sodium sulfate ($Na_2SO_4$), and potassium sulfate ($K_2SO_4$).

The present disclosure provides a variety of advantages over prior art systems and methods. Advantages can include any one of more of the following: elimination of solid reactants that are typically required in carbon dioxide removal systems; regeneration of part or all the reactants used in the process; generation of one or more value added chemicals; increased density of processes that can be carried out; reduction in process equipment size, complexity, and cost; integration of process heat; elimination of fossil fuel combustion as an energy source; and/or using renewable electricity as one energy source or the sole energy source.

In one or more embodiments, the present disclosure provides a system for direct capture (including direct air capture) of one or more moieties with co-generation or one or more chemicals. In an example embodiment configured for capture of carbon dioxide, the system can comprise: a compression unit configured to provide a compressed carbon dioxide containing gas discharge stream; a scrubbing unit configured for contacting the compressed carbon dioxide containing gas discharge stream with an alkali solution to form a carbonate solution and output a carbon dioxide lean gas stream; a regeneration unit configured for reacting the carbonate solution with a halogenated compound to form one or more metal salts and output a stream comprising carbon dioxide; and an electrolysis unit configured to react the one or more metal salts with water to regenerate the alkali solution and form one or more further chemicals. In one or more further embodiments, the system can be defined in relation to one or more of the following statements, which can be combined in any number and order.

The compression unit can be an air capture plant.

The alkali solution can comprise a solution of one or more metal salts, the metal being chosen from alkali metals, alkaline earth metals, and combinations thereof.

The alkali solution can comprise a solution of sodium hydroxide.

The system further can comprise a crystallization unit configured to receive at least a portion of the carbonate solution and output at least one or more solids.

The crystallization unit can be further configured to output an alkali solution suitable for recycle back to the scrubbing unit.

The system further can comprise a carbon dioxide purification unit configured to receive the stream comprising carbon dioxide output from the regeneration unit.

The carbon dioxide purification unit can be a cryogenic unit.

The system further can comprise a catalytic reactor configured to receive carbon dioxide from the carbon dioxide purification unit.

The system further can comprise one or more expanders configured to expand a pressurized stream and generate energy.

In one or more embodiments, the present disclosure provides a method for capture (including direct air capture) of one or more moieties with co-generation or one or more chemicals. In an example embodiment for capture of carbon dioxide, the method can comprise: contacting a gaseous carbon dioxide containing stream in a scrubbing unit with an alkali solution to form a carbonate solution and output a carbon dioxide lean gas stream; reacting the carbonate solution with a halogenated compound to form one or more metal salts and output a stream comprising carbon dioxide; and reacting the one or more metal salts with water under electrolysis conditions to regenerate the alkali solution and form one or more further chemicals. In one or more further embodiments, the method can be defined in relation to one or more of the following statements, which can be combined in any number and order.

The gaseous carbon dioxide containing stream can be one or a combination of air and a flue gas.

The alkali solution can comprise a solution of one or more metal salts, the metal being chosen from alkali metals, alkaline earth metals, and combinations thereof.

The alkali solution can comprise a solution of sodium hydroxide.

The method further can comprise subjecting at least a portion of the carbonate solution to a crystallization process effective to separate one or more solids from the carbonate solution and output an alkali solution suitable for recycle back to the scrubbing unit.

The crystallization process can comprise heating or cooling the carbonate solution.

The method further can comprise processing the stream comprising carbon dioxide in a carbon dioxide purification unit configured to output a stream of substantially pure carbon dioxide.

The carbon dioxide purification unit can be a cryogenic unit.

The method further can comprise reacting at least a portion of the stream of substantially pure carbon dioxide with hydrogen to form a hydrocarbon fuel.

The method further can comprise expanding one or more pressurized streams to generate energy.

The one or more further chemicals that are formed can include hydrogen and a halogen gas.

The method further can comprise reacting at least a portion of the hydrogen with at least a portion of the halogen gas to form an acid.

The method further can comprise using heat formed from reacting at the least a portion of the hydrogen with the at least a portion of the halogen gas to generate power in a steam cycle.

The method further can comprise reacting at least a portion of the hydrogen with at least a portion of the halogen gas in a fuel cell.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

DETAILED DESCRIPTION OF THE DISCLOSURE

Figure 1:
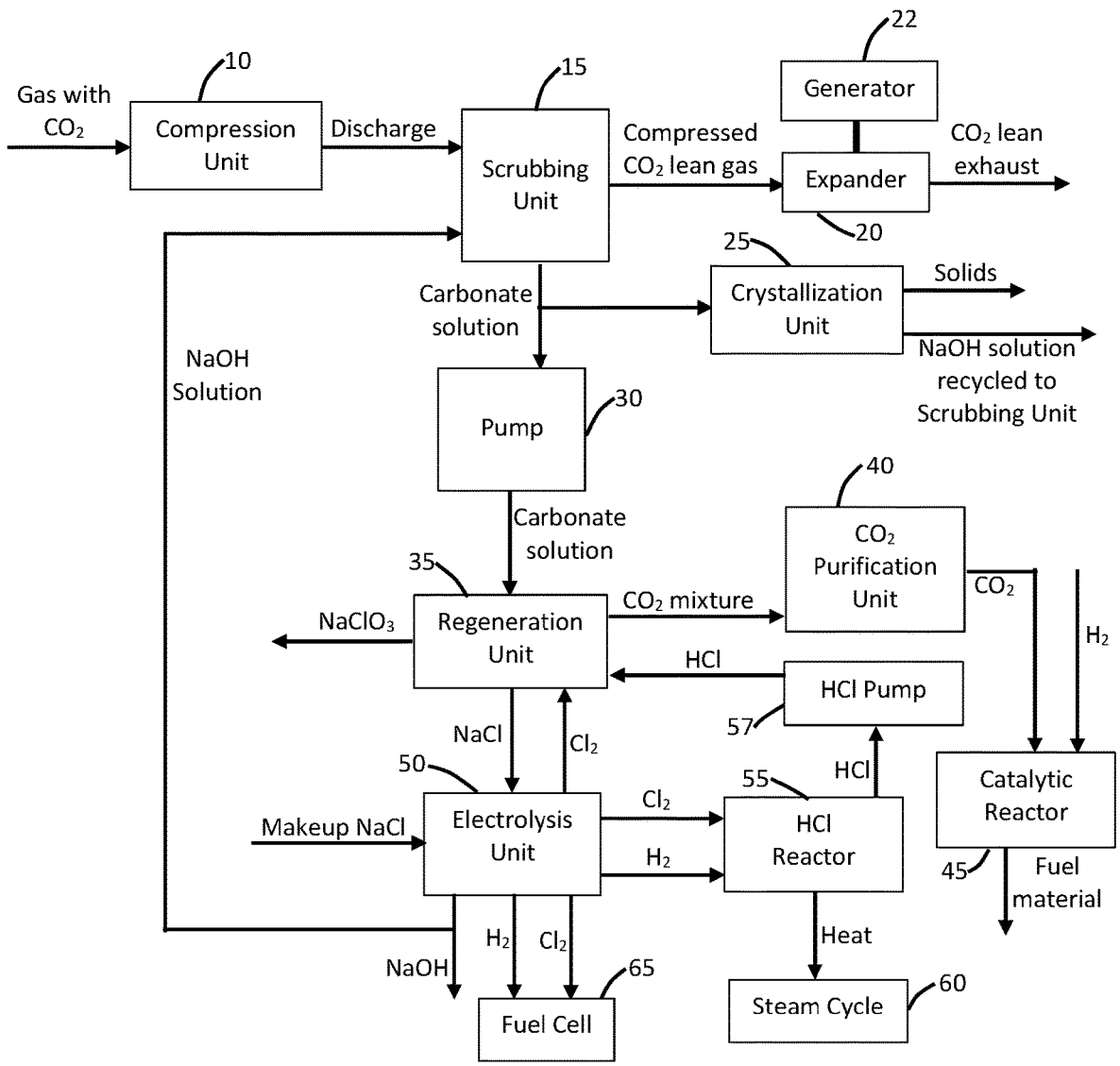
FIG. 1 is a flow diagram illustrating systems and processes wherein a gas stream is subjected to scrubbing with an alkali solution to remove a moiety, such as carbon dioxide, and the removed moiety is isolated with recycling of the alkali solution and simultaneous production of one or more further chemicals according to example embodiments of the present disclosure.
Figure 2:
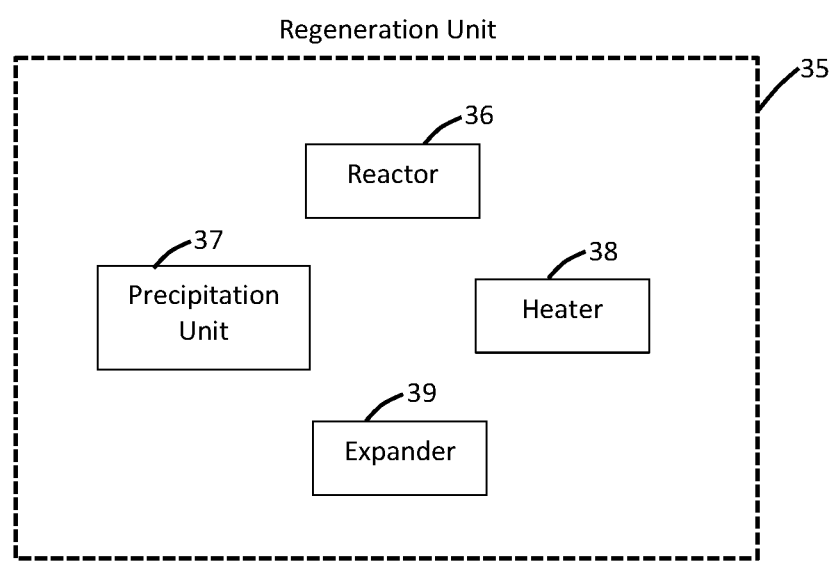
FIG. 2 is an illustration of a plurality of individual components that may be utilized in a regeneration unit according to example embodiments of the present disclosure.

The present disclosure provides systems and methods useful for direct capture (including direct air capture) of one or more moieties (e.g., carbon dioxide) from a gaseous mixture. Such systems and methods can use, for example, a solution of one or more caustic materials, and more particularly, a solution of one or more alkali materials. The utilized solution may thus be referenced herein as an alkali solution. Such solutions can be used to capture $CO_2$ (or other moieties) from gaseous mixtures, such as air and/or the flue gas from an air combustion process. In some embodiments, sodium hydroxide (NaOH) can be particularly useful as the caustic or alkali material, and the present disclosure can utilize sodium hydroxide as an example embodiment throughout for purposes of illustration. It is understood, however, that further materials may be utilized, such as potassium hydroxide, calcium hydroxide, magnesium hydroxide, and the like, and a skilled person utilizing the example embodiments herein would be expected to be equipped to implement the present disclosure utilizing solutions of one or more further caustic, and particularly alkali, materials. Thus, an alkali solution, in one or more embodiments can comprise a solution of one or more metal salts, the metal being chosen from alkali metals, alkaline earth metals, and combinations thereof. As an example embodiment, capture of a moiety (e.g., carbon dioxide) can be carried out according to the reaction (1) utilizing sodium hydroxide in solution and, as such, sodium hydroxide is an example of an alkali solution that can be utilized herein.

$$2NaOH + CO_2 = H_2O + Na_2CO_3 \quad (1)$$

Carbon dioxide is thus captured in the form of sodium carbonate, or a carbonate of a corresponding metal moiety. The captured $CO_2$ can then be released through one or more reactions such reaction (2) and reaction (3) shown below and/or others known to those in the art.

$$3Na_2CO_3 + 3Cl_2 \rightarrow 5NaCl + NaClO_3 + 3CO_2 \quad (2)$$

$$2HCl + Na_2CO_3 \rightarrow 2NaCl + CO_2 + H_2O \quad (3)$$

The starting materials and/or one or more intermediate materials formed in the present processes can be regenerated as desired. For example, one or more of NaOH, HCl, and $Cl_2$ can be regenerated through a chlor-alkali process, such as utilizing reaction (4) and reaction (5) shown below. In some embodiments, energy recovery can be implemented in at least reaction (5), such as via thermal or electrochemical methods, and such methods may be applied to any reactions discussed herein where energy is created as a by-product. While chlorine is exemplified herein, it is understood that halogens other than chlorine can be substituted in some cases as known to those skilled in the art.

$$2NaCl + 2H_2O \rightarrow Cl_2 + H_2 + 2NaOH \quad (4)$$

$$Cl_2 + H_2 = 2HCl \quad (5)$$

In certain embodiments, it may be economically beneficial to release at least a portion of any captured $CO_2$ using $H_2SO_4$, as in reaction (6) shown below. This may be in cases, for example, where the cost of $H_2SO_4$ is low enough that its use would offer economic benefit to the direct air capture process. In some such embodiments, the $H_2SO_4$ may be produced by oxidation of $H_2S$ produced by a sour gas sweetening process. In some embodiments, the $CO_2$ produced by direct air capture can in turn be used in the sour gas sweetening process, offering further efficiency and/or economic advantages.

$$H_2SO_4 + Na_2CO_3 \rightarrow Na_2SO_4 + CO_2 + H_2O \quad (6)$$

Direct air capture systems can require electricity to run an air capture reactor, $CO_2$ compressors, and other equipment. Accordingly, the present systems and methods may be combined with a power-production process whereby various components may be utilized in both processes. Alternatively, or additionally, the present systems and methods can be operated so as to co-produce energy, which can supply part of all of the energy needed for carrying out the present processes.

An example embodiment of a system and process for removing carbon dioxide or other moieties from an input gas stream (e.g., air) is illustrated in FIG. 1. Initially, the input gas, which in some embodiments is air, is first passed through a compression unit 10 to pressurize the gas above ambient. The compression unit can be configured to pressurize the gas stream to a relatively low pressure, such as about 1.5 bar to about 20 bar, about 2 bar to about 15 bar, or about 3 bar to about 10 bar. A single stage compressor may be used, or the compressor may include multiple stages of compression, which can optionally be intercooled. In embodiments wherein air is the starting gas, the exemplified compression unit 10 may be part of an air capture plant or unit, which can include one or more blowers, pumps, or compressors suitable for intake of air and compression as otherwise described above.

The discharge gas exiting the compressor can be passed to a scrubbing unit 15, which can comprise, for example, one or more columns configured to cause the pressurized discharge gas to contact a solution of a caustic material (e.g., an alkali material) as described above. For example, a countercurrent scrubbing column may be used. In the example embodiment of FIG. 1, a solution of NaOH is utilized. The scrubbing unit 15 can be designed in some embodiments as an air blower with a wet caustic scrubber to absorb $CO_2$ from the air into the caustic solution. Alternatively, the scrubbing unit 15 can be a unique design such that it operates as a forced draft configuration. The caustic solution can be continuously recirculated and temperature controlled until a desired level of carbonation has occurred.

The compressed gas exiting the scrubbing unit 15 is carbon dioxide lean and thus can be characterized as being decarbonized. Use of the term "carbon dioxide lean" can indicate that the makeup of the stream is relative to the gas stream that is input to the scrubbing unit 15, which may be considered to be carbon dioxide rich. Thus, carbon dioxide rich and carbon dioxide lean are relative terms and are not limited to indicating a precise carbon dioxide content. For example, the carbon dioxide content of the gas exiting the scrubbing unit 15 (a carbon dioxide lean gas stream) can be less than at least 50%, at least 75%, at least 90%, or at least 95% less (e.g., up to 100% less) than the $CO_2$ content of the discharge gas entering the scrubbing unit 15 (which, by relation, can be referenced as being carbon dioxide rich). As an example, the carbon dioxide content of ambient air is calculated to presently be in excess of 400 ppm. In some embodiments, the compressed, $CO_2$ lean gas exiting the scrubbing unit 15 can comprise less than 400 ppm, less than 300 ppm, less than 200 ppm, less than 100 ppm, or less than 50 ppm of carbon dioxide (e.g., approaching 0 ppm) based on the total mass of the compressed gas. The compressed carbon dioxide lean gas exiting the scrubbing unit 15 can be sent to an expander 20 for energy recovery. As seen in FIG. 1, the expander 20 can be coupled to a generator 22 so as to create, for example, electricity. Other expanders referenced herein may likewise include a suitable generator therewith. The carbon dioxide lean exhaust gas leaves the expander 20 at a temperature well below ambient temperature, for example, less than 20° C., less than 15° C., less than 10° C., or less than 5° C. (e.g., approaching 0° C.), thereby having a potential use in HVAC applications and/or for use as a cooling stream where cooling may be required.

In addition to the compressed, carbon dioxide lean gas, a carbon dioxide laden scrubbing solution also exits the scrubbing unit 15. When NaOH is utilized as the caustic agent, the solution exiting the scrubbing unit 15 can include primarily (e.g., greater than 50%, greater than 75%, or greater than 90% by mass) sodium carbonate ($Na_2CO_3$) in solution with residual NaOH. This carbonate solution can be withdrawn from the scrubbing unit 15 and treated in one more manners. In some embodiments, at least a portion of the carbonate solution can be passed to a crystallization unit 25 to separate sodium carbonate from the residual sodium hydroxide. In the crystallization unit 25, heating or cooling can be applied as necessary to perform a crystallization process effective to crystallize one or both of sodium carbonate and sodium bicarbonate ($NaHCO_3$), which can be removed as solids. For example, the carbonate solution can be heated to a suitable temperature and pressure range to remove water. A suitable temperature can be about 40° C. to about 110° C., about 50° C. to about 100° C., or about 60° C. to about 100° C., and a suitable pressure can be about atmospheric pressure or below, such as about −5 bar to about 2 bar, about −3 bar to about 1.5 bar, or about −2 bar to about 1 bar. Water removal can be carried out to cause supersaturation of the carbonates and ultimately precipitation of solids for removal by settling, centrifugation, filtration, or similar method. Similar results may be achieved through cooling of the carbonate solution for water removal. Suitable temperatures can be in the range of about 0° C. to about 20° C., about 0° C. to about 15° C., or about 0° C. to about 10° C., and a pressure range as noted above may again be utilized. Recovered NaOH solution can be recycled back to the scrubbing unit 15 for carbon dioxide capture to minimize solvent loss in the system. Solids from the crystallization unit can be dewatered and sold as a chemical byproduct (e.g., soda ash). Part of all of the solids may be re-combined with water to reform the carbonate solution for further processing, as described below.

Part of all of the carbonate solution leaving the scrubbing unit 15 (and additionally, in some embodiments, carbonate solution formed from solids exiting the crystallization unit 25) can be passed through a pump 30 to increase the pressure thereof. In some embodiments, the carbonate solution can be pumped to a pressure of at least 2 bar, at least 3 bar, at least 5 bar, at least 10 bar, at least 20 bar, or at least 50 bar (e.g., up to a maximum pressure as dictated by the process component limitations). In some embodiments, the carbonate solution can be pumped to a pressure of about 2 bar to about 100 bar, about 5 bar to about 95 bar, about 10 bar to about 90 bar, about 20 bar to about 85 bar, or about 60 bar to about 80 bar. It is understood that the pump 30 can be an optional element, and the carbonate solution need not necessarily be pumped to an increased pressure prior to passage to the regeneration unit 35.

In the regeneration unit 35, the carbonate solution can be reacted with a reactive material, such as a halogenated compound, to release carbon dioxide gas. In some embodiments, the halogenated compound specifically can be a chlorine-containing material. For example, the $Na_2CO_3$ solution in the regeneration unit 35 can react with a $Cl_2$ gas, a $Cl_2$ liquid, an HCl solution, or some combination thereof. Likewise, the chlorine may be substituted or combined with another halogen. A halogenated compound may thus be any halogen-containing material, particularly wherein the halogen moiety is available for reacting with the carbonate. The predominant chemical reactions for $CO_2$ generation in the regeneration unit when using chlorine as the reactive agent are provided below in reactions (7) through (10). As seen below, the primary products of the reactions are sodium NaCl, $NaClO_3$, $CO_2$, and water. It is understood that the sodium and chlorine containing compounds are representative of metal salts in general that can be formed, and the exact nature of the metal salts will vary based upon the alkali metal or alkaline earth metal that is used in the alkali solution and the halogen that is used in the halogenated material.

$$3Na_2CO_3+3Cl_2 \rightarrow 5NaCl+NaClO_3+3CO_2 \quad (7)$$

$$2HCl+Na_2CO_3 \rightarrow 2NaCl+CO_2+H_2O \quad (8)$$

$$NaOH+HCl \rightarrow NaCl+H_2O \quad (9)$$

$$3Cl_2+6NaOH \rightarrow 5NaCl+NaClO_3+3H_2O \quad (10)$$

The stream containing carbon dioxide that is generated in the regeneration unit 35 can be processed for removal or impurities, such as chlorine, HCl, and water, in a $CO_2$ purification unit 40. Such unit can be cryogenic unit and/or other type of $CO_2$ purification unit. Substantially pure carbon dioxide (e.g., at least 95%, at least 98%, at least 99%, or at least 99.5% molar $CO_2$) exiting the $CO_2$ purification unit 40 is preferably at a sufficiently high pressure and purity for export (e.g., through a $CO_2$ pipeline) and/or for chemical production. For example, produced carbon dioxide can be utilized in EOR or similar processes. In some embodiments, all or part of the produced carbon dioxide may be utilized in, for example, a catalytic reactor 45 where it can be combined with hydrogen gas at suitable temperature and pressure ranges to produce one or more hydrocarbon fuels, such as methanol, ethanol, methane, or higher hydrocarbon mixtures useful in fuels, such as gasoline. In particular embodiments, a methanation unit may specifically be utilized. In further embodiments, the catalytic reactor 45 may be any reactor suitable for carrying out the necessary reactions, such as Fischer-Tropsch processes, such that the carbon dioxide and hydrogen may be combined in in a manner suitable for forming a fuel material, and more particularly a hydrocarbon fuel, which can include methanol, methane, one or more higher alcohols or hydrocarbons, and combinations thereof. As non-limiting examples, the catalytic reactor 45 may utilize a metal catalyst, such as nickel, iron, cobalt, ruthenium, or other transition metals. The reactions for fuel formation typically can be carried out at a temperature of about 150° C. to about 350° C. and a pressure range of about 1 bar to about 30 bar.

The regeneration unit 35 can comprise a plurality of individual components that can be useful in preparing the products exiting therefrom. For example, the regeneration unit can include one or more reactors 36 that are suitable for carrying out the reactions discussed above (e.g., reactions (7) through (10)). In some embodiments, the regeneration unit 35 can include a precipitation unit 37 wherein $NaClO_3$ can be precipitated and separated from the solution by saturating it with NaCl, or by other methods known to those of skill in the art. Separated $NaClO_3$ can be exported as a valuable chemical by-product. Other products such as NaOCl, $NaClO_4$, $Cl_2O$, and/or $ClO_2$ may be produced, separated, and exported in some embodiments. Alternatively, the $NaCl/NaClO_3$ solution can be heated to a higher temperature, for example about 300° C. or greater, utilizing one or more heaters 38. The $NaClO_3$ then decomposes into NaCl and $O_2$ as shown below in reaction (11). Oxygen gas can then be captured and exported as a by-product.

$$2NaClO_3 \rightarrow 2NaCl+3O_2 \quad (11)$$

Remaining liquid in the regeneration unit 35 can be reduced in pressure via an energy recovery device (e.g., an expander 39) and then passed to an electrolysis unit 50. The electrolysis unit 50 can include one or a plurality of components suitable for reacting one or more metals salts with water under electrolysis conditions to regenerate the alkali solution and form one or more further chemicals. For example, such electrolysis conditions may include reaction conditions commonly utilized in a chloralkali process. Further, the electrolysis unit may include a membrane cell to maintain separation of formed hydrogen and halogen species, or other configurations, such as a diaphragm cell or unpartitioned cell may be utilized. In the electrolysis unit 50, sodium chloride, for example, and water can be added in the presence of positive and negative electrodes to form sodium hydroxide, $H_2$ gas, and $Cl_2$ gas through the overall reaction shown below in reaction (12). While sodium hydroxide and chlorine gas are exemplified in the reaction below, it is understood that any hydrogen base may be formed depending upon the halogenated material that is utilized in the regeneration unit 35. Likewise, other alkali solutions may be formed depending upon the alkali metal or alkali earth metal that is originally used in alkali solution that is introduced to the scrubbing unit. Such variations also apply to the further discussion of materials below, including optional uses for the further chemicals that are produced from the electrolysis unit 50.

$$2NaCl+2H_2O \rightarrow Cl_2+H_2+2NaOH \quad (12)$$

The individual components formed in the electrolysis unit 50 can be utilized in a variety of manners. To keep the mass balance of halogens in this highly recycled system, some makeup salt water or other halogenated material can be utilized in the electrolysis unit 50. In addition, excess chloralkali electrolyzer capacity may be beneficial in improving the overall operating and/or economic efficiency of the system.

All or a portion of the sodium hydroxide generated in the electrolysis unit 50 can be used to form regenerated NaOH solution, which can be recycled back into the scrubbing unit 15 for $CO_2$ capture from the input gas. Chlorine gas that is regenerated in the electrolysis unit 50 can be compressed to a relatively high pressure and fed into the regeneration unit 35 for stripping $CO_2$ from the $Na_2CO_3$ solution.

Hydrogen generated from the electrolysis unit 50 can be exported as a by-product. Alternatively, or additionally, all or part of the hydrogen gas can be sent to the catalytic reactor 45 to combine with the captured $CO_2$ to form substantially carbon free methanol, and/or other fuel materials. Alternatively, or additionally, $H_2$ gas and chlorine gas can be sent to an HCl reactor 55 to react and form an HCl solution for delivery to the regeneration unit 35 for use in $CO_2$ stripping via reaction (5) provided above. The HCl optionally can be passed through an HCl pump 57 to pressurize the HCl. The thermal energy (e.g., heat) generated from the HCl reactor 55 can be used to drive a steam cycle 60 and thus create electrical energy, and/or it can be used to heat $CO_2$ depleted compressed air at the inlet of the expander 20 receiving the compressed $CO_2$ lean gas to increase the power generation from the expander. Alternatively, the $H_2$ and $Cl_2$ can be reacted in a fuel cell 65 to generate electricity for use anywhere in the overall system, or for sale. For example, known $H_2/O_2$ fuel cells may be appropriately modified by known methods to efficiently generate electricity utilizing $H_2$ and $Cl_2$. See, for example, Huskinson et al., "A high power density, high efficiency hydrogen-chlorine regenerative fuel cell with a low precious metal content catalyst," Energy and Environmental Science, 5(9), June, 2012.

The $H_2$ and $Cl_2$, produced methanol or other hydrocarbon fuels, and/or the thermal energy of the overall system may be stored as a means of energy load leveling for the overall system and/or for the local electrical grid. This may be used to improve the overall system economics, the economics of a renewable electricity generation system, or the local grid.

As seen from the foregoing, the present systems and methods can be configured to remove one or more moieties from a starting gas stream, and this can be particularly useful for removal of carbon dioxide from a gas stream, and specifically direct capture from air. The systems and methods beneficially can also simultaneously provide for co-generation of one or more value added chemicals. Such chemicals can be produced singularly or in any combination. Non-limiting examples of chemicals that may be produced include hydrogen ($H_2$), chlorine ($Cl_2$), hydrogen chloride (HCl), sodium chloride (NaCl), potassium chloride (KCl), sodium hydroxide (NaOH), potassium hydroxide (KOH), sodium carbonate ($Na_2CO_3$), potassium carbonate ($K_2CO_3$), sodium hypochlorite (NaClO), potassium hypochlorite (KClO), sodium chlorate ($NaClO_3$), potassium chlorate ($KClO_3$), dichlorine monoxide ($Cl_2O$), chlorine dioxide ($ClO_2$), sodium perchlorate ($NaClO_4$), potassium perchlorate ($KClO_4$) sodium sulfate ($Na_2SO_4$), and potassium sulfate ($K_2SO_4$). In some embodiments, the systems and methods can be configured such that the co-generation of the one or more value added chemicals can be in a significant excess. In particular, the systems and method can be configured such that one or more chemicals necessary for operation of the capture process is produced in an amount that substantially or significantly exceeds an amount that may be required for said operation. This can be particularly beneficial in order to improve the overall capital and/or operating engineering and/or economic efficiency of the overall system. The systems and methods thus can include a variety of elements and process steps as otherwise described herein, said variety of elements and process steps being capable of implementation in any order and number as would be evident based upon a holistic reading of the present disclosure.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. A system for capture of carbon dioxide with co-generation or one or more chemicals, the system comprising:
    a compression unit configured to provide a compressed carbon dioxide containing gas discharge stream;
    a scrubbing unit configured for contacting the compressed carbon dioxide containing gas discharge stream with an alkali solution to form a carbonate solution and output a carbon dioxide lean gas stream;
    a regeneration unit configured for reacting the carbonate solution with a halogenated compound to form one or more metal salts and output a stream comprising carbon dioxide;
    a carbon dioxide purification unit configured to receive the stream comprising carbon dioxide output from the regeneration unit; and
    an electrolysis unit configured to react the one or more metal salts with water to regenerate the alkali solution and form one or more further chemicals.

2. The system of claim 1, wherein the compression unit is an air capture plant.

3. The system of claim 1, wherein the alkali solution comprises a solution of one or more metal salts, the metal being chosen from alkali metals, alkaline earth metals, and combinations thereof.

4. The system of claim 3, wherein the alkali solution comprises a solution of sodium hydroxide.

5. The system of claim 1, further comprising a crystallization unit configured to receive at least a portion of the carbonate solution and output at least one or more solids.

6. The system of claim 5, wherein the crystallization unit is further configured to output an alkali solution suitable for recycle back to the scrubbing unit.

7. The system of claim 1, wherein the carbon dioxide purification unit is a cryogenic unit.

8. The system of claim 1, further comprising a catalytic reactor configured to receive carbon dioxide from the carbon dioxide purification unit.

9. The system of claim 1, further comprising one or more expanders configured to expand a pressurized stream and generate energy.

10. A method for capture of carbon dioxide with co-generation or one or more chemicals, the method comprising:
    contacting a gaseous carbon dioxide containing stream in a scrubbing unit with an alkali solution to form a carbonate solution and output a carbon dioxide lean gas stream;
    reacting the carbonate solution with a halogenated compound to form one or more metal salts and output a stream comprising carbon dioxide;
    processing the stream comprising carbon dioxide in a carbon dioxide purification unit configured to output a stream of substantially pure carbon dioxide; and
    reacting the one or more metal salts with water under electrolysis conditions to regenerate the alkali solution and form one or more further chemicals.

11. The method of claim 10, wherein the gaseous carbon dioxide containing stream is one or a combination of air and a flue gas.

12. The method of claim 10, wherein the alkali solution comprises a solution of one or more metal salts, the metal being chosen from alkali metals, alkaline earth metals, and combinations thereof.

13. The method of claim 12, wherein the alkali solution comprises a solution of sodium hydroxide.

14. The method of claim 10, further comprising subjecting at least a portion of the carbonate solution to a crystallization process effective to separate one or more solids from the carbonate solution and output an alkali solution suitable for recycle back to the scrubbing unit.

15. The method of claim 14, wherein the crystallization process comprises heating or cooling the carbonate solution.

16. The method of claim 10, wherein the carbon dioxide purification unit is a cryogenic unit.

17. The method of claim 10, further comprising reacting at least a portion of the stream of substantially pure carbon dioxide with hydrogen to form a hydrocarbon fuel.

18. The method of claim 10, further comprising expanding one or more pressurized streams to generate energy.

19. The method of claim 10, wherein the one or more further chemicals that are formed include hydrogen and a halogen gas.

20. The method of claim 19, further comprising reacting at least a portion of the hydrogen with at least a portion of the halogen gas to form an acid.

21. The method of claim 20, further comprising using heat formed from reacting at the least a portion of the hydrogen with the at least a portion of the halogen gas to generate power in a steam cycle.

22. The method of claim 19, further comprising reacting at least a portion of the hydrogen with at least a portion of the halogen gas in a fuel cell.

23. A system for capture of carbon dioxide with co-generation or one or more chemicals, the system comprising:
- a compression unit configured to provide a compressed carbon dioxide containing gas discharge stream;
- a scrubbing unit configured for contacting the compressed carbon dioxide containing gas discharge stream with an alkali solution to form a carbonate solution and output a carbon dioxide lean gas stream;
- a regeneration unit configured for reacting the carbonate solution with a halogenated compound to form one or more metal salts and output a stream comprising carbon dioxide;
- a carbon dioxide purification unit configured to receive the stream comprising carbon dioxide output from the regeneration unit; and
- an electrolysis unit configured to react the one or more metal salts with water to regenerate the alkali solution and form one or more further chemicals;
- wherein one or both of the following conditions applies:
  - the compression unit is an air capture plant;
  - the system further comprises one or more expanders configured to expand a pressurized stream and generate energy.

24. A method for capture of carbon dioxide with co-generation or one or more chemicals, the method comprising:
- contacting a gaseous carbon dioxide containing stream in a scrubbing unit with an alkali solution to form a carbonate solution and output a carbon dioxide lean gas stream;
- reacting the carbonate solution with a halogenated compound to form one or more metal salts and output a stream comprising carbon dioxide;
- reacting the one or more metal salts with water under electrolysis conditions to regenerate the alkali solution and form one or more further chemicals; and
- expanding one or more pressurized streams to generate energy.

* * * * *